United States Patent [19]

Heinsohn et al.

[11] 4,163,115

[45] Jul. 31, 1979

[54] PREPARATION OF ESTERS OF POLY-(TETRAMETHYLENE ETHER) GLYCOL

[75] Inventors: George E. Heinsohn, Newark; Ivan M. Robinson, Wilmington, both of Del.; Gerfried Pruckmayr, Media, Pa.; Walter W. Gilbert, Hockessin, Del.

[73] Assignee: E. I. Du Pont de Nemours and Company, Wilmington, Del.

[21] Appl. No.: 869,272

[22] Filed: Jan. 13, 1978

Related U.S. Application Data

[63] Continuation-in-part of Ser. No. 751,211, Dec. 16, 1976, abandoned, which is a continuation-in-part of Ser. No. 672,555, Mar. 31, 1976, abandoned.

[51] Int. Cl.² .................................................. C07C 67/24
[52] U.S. Cl. ................................. 560/240; 260/410.6; 560/1; 560/8; 560/112; 560/129; 560/209; 560/227; 568/617

[58] Field of Search ................. 560/240, 1, 8, 112, 560/129, 209; 260/410.6

[56] References Cited

U.S. PATENT DOCUMENTS

| 2,691,038 | 10/1954 | Engelhardt | 260/484 P |
|---|---|---|---|
| 3,433,829 | 3/1969 | Dorfelt | 260/496 |

FOREIGN PATENT DOCUMENTS 47-18819 9/1972 Japan ................................. 260/496

*Primary Examiner*—Vivian Garner

[57] ABSTRACT

Esters of poly(tetramethylene ether) glycol are prepared by polymerizing tetrahydrofuran in a reaction mixture which contains, in addition to the tetrahydrofuran, and acylium ion precursor such as acetic anhydride, a polymeric catalyst which contains sulfonic acid groups and, optionally, a carboxylic acid such as acetic acid.

13 Claims, 2 Drawing Figures

PREPARATION OF ESTERS OF POLY-(TETRAMETHYLENE ETHER) GLYCOL

CROSS REFERENCE TO RELATED APPLICATIONS

This application is a continuation-in-part of copending application Ser. No. 751,211, filed Dec. 16, 1976, now abandoned, as a continuation-in-part of application Ser. No. 672,555, filed Mar. 31, 1976 and now abandoned.

BACKGROUND OF THE INVENTION

Poly(tetramethylene ether) glycol (PTMEG) is a commodity in the chemical industry, widely used in the manufacture of polyurethanes and polyesters. It is commonly prepared by reacting tetrahydrofuran (THF) with fluorosulfonic acid and then quenching the product with water. While this process has proved to be quite satisfactory, it is not as efficient as desired because the acid cannot be recovered and reused. Moreover, disposal of the spent acid is a problem because of its toxicity and corrosiveness.

SUMMARY OF THE INVENTION

It has now been found that esters of PTMEG can be prepared by polymerizing THF in a reaction mixture which contains in addition to the THF, an acylium ion precursor and a catalyst for the polymerization reaction which can be described as a polymer containing alpha-fluorosulfonic acid groups. These esters can then be converted to PTMEG.

In the process, the nature of the catalyst permits its reuse, thereby eliminating the disposal problem, and the catalyst's low solubility in the reaction mass makes it easy to separate the product from the catalyst at the end of the reaction. This low solubility also minimizes loss of catalyst as the reaction proceeds.

The process of the invention comprises bringing together, under conditions suitable for polymerization, the THF reactant, an acylium ion precursor, the catalyst and optionally a carboxylic acid.

The polymerization is believed to involve the steps of initiation, propagation, chain transfer, redistribution, termination and catalyst regeneration. These steps occur simultaneously, in a competing manner, and are thought to proceed as shown in the following equations in which, for purposes of illustration, a carboxylic anhydride is used as the acylium ion precursor.

Initiation

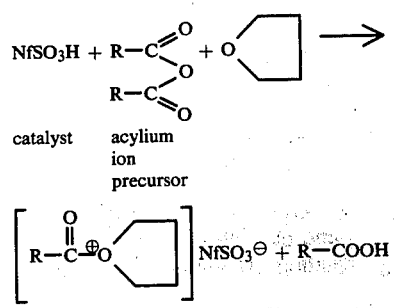

acyl oxonium ion
Propagation

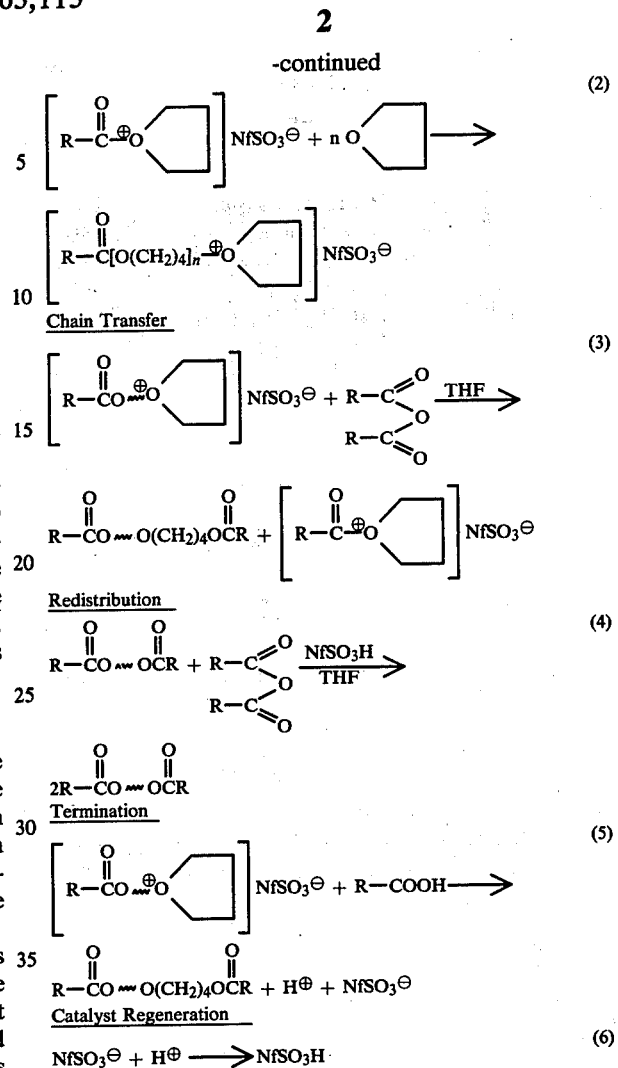

In these equations, R is hydrogen or a hydrocarbon radical, preferably an alkyl radical of 1 to 36 carbon atoms, NfSO$_3$H represents the catalyst and $\sim$ represents the poly(tetramethylene ether) chain.

When the reactions are complete, the catalyst can be separated from the reaction mass and reused.

DETAILED DESCRIPTION OF THE INVENTION

Figure 1:
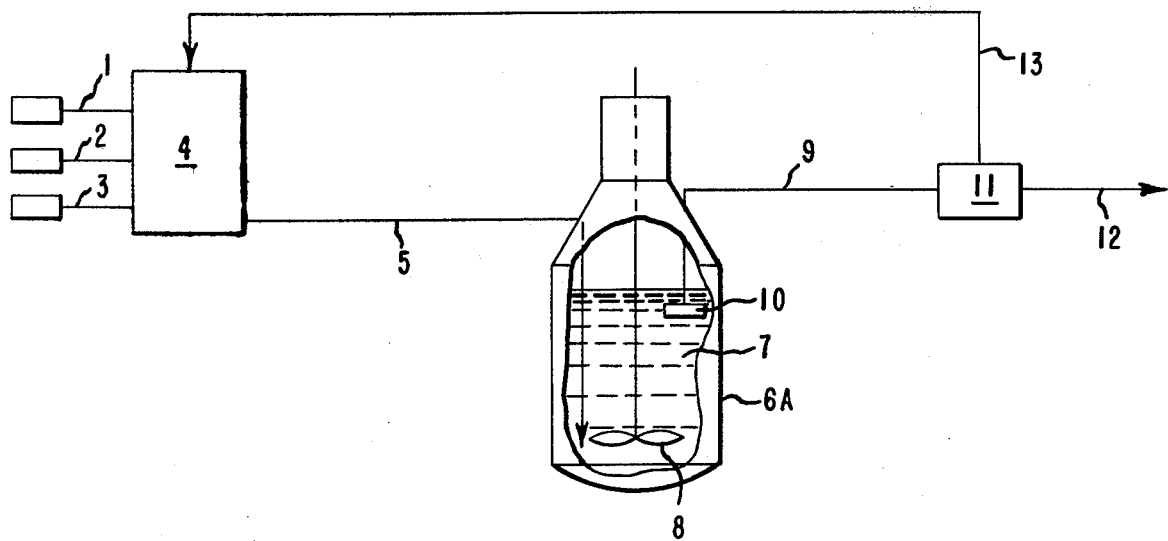
FIG. 1 is a schematic diagram of a slurry reactor and associated apparatus which can be used to conduct the process of the invention.

The THF used as the reactant in the process of the invention can be any of those commercially available. It preferably has a water content of less than about 0.001%, by weight, and a peroxide content of less than 0.002%, by weight, and preferably contains an oxidation inhibitor such as butylated hydroxytoluene to prevent formation of undesirable byproducts and color.

If desired, 0.1 to 50% by weight of the THF of an alkyl tetrahydrofuran, copolymerizable with THF, can be used as a coreactant. Such an alkyl THF can be represented by the structure.

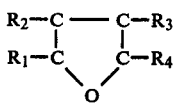

where any one of $R_1$, $R_2$, $R_3$ or $R_4$ is an alkyl radical of 1 to 4 carbon atoms, the remaining R's being hydrogen.

Illustrative of such alkyl tetrahydrofurans are 2-methyl tetrahydrofuran and 3-methyl tetrahydrofuran.

The catalyst used in the process of the invention is a homopolymer of an ethylenically unsaturated monomer (a) containing groups such that the final polymer will contain groups of the formula

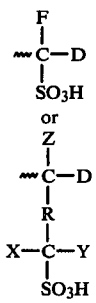

where
- ⁓ represents the polymer chain or a segment thereof;
- D is hydrogen, an aliphatic or aromatic hydrocarbon radical of 1 to 10 carbon atoms, a halogen atom or a segment of the polymer chain;
- X and Y are hydrogen, halogen, an aliphatic or aromatic hydrocarbon radical of 1 to 10 carbon atoms or fluorine, but at least one must be fluorine;
- R is a linear or branched linking group having up to 40 carbon atoms in the principal chain, and
- Z is hydrogen, halogen, an aliphatic or aromatic hydrocarbon radical of 1 to 10 carbon atoms or fluorine, or a copolymer of monomer (a) with at least one other copolymerizable ethylenically unsaturated monomer (b).

The linking group defined by R in formula (9) can be a homogeneous one such as an alkylene radical, or it can be a heterogeneous one such as an alkylene ether radical. In the preferred catalysts, this linking radical contains 1 to 20 carbon atoms in the principal chain. In the especially preferred catalyst, R is a radical of the structure

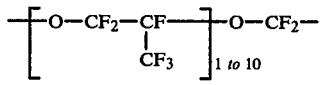

Illustrative of monomer (a) are such monomers as trifluorovinyl sulfonic acid, linear or branched chain vinyl monomers containing sulfonic acid group precursors and perfluoroalkylvinyl ethers containing sulfonic acid group precursors.

Illustrative of monomer (b) are such monomers as ethylene, styrene, vinyl chloride, vinyl fluoride, vinylidene fluoride, chlorotrifluoroethylene (CTFE), bromotrifluoroethylene (BTFE), vinyl ethers, perfluoroalkyl vinyl ethers, butadiene, tetrafluoroethylene (TFE) and hexafluoropropylene (HFP).

The homopolymerization and copolymerization can be done according to the procedures described in U.S. Pat. No. 3,784,399 to Grot, and the patents cited therein. Monomer ratios are selected to give the resulting polymer the proper equivalent weight.

The catalysts have equivalent weights of 950 to 1,500, preferably 1,100 to 1,300. Equivalent weight of a catalyst is that weight in grams which contains one gram equivalent weight of sulfonic acid groups, and can be determined by titration.

The catalysts preferably have solubilities such that no more than about 5%, by weight, dissolves in the reaction mass at the reaction temperature when the reaction is run in a batch mode for a time to be specified hereinafter. This solubility is determined gravimetrically.

It is desirable that the solubility of the catalyst be as low as possible because this minimizes catalyst loss and permits the process to be run for longer periods without catalyst replenishment. Preferably, the solubility is no more than about 1%, by weight, and even more preferably is below the threshold of detection with present analytical techniques.

The catalyst should be effectively free of functional groups, other than —SO₃H groups, which might interfere with the polymerization reaction. "Effectively free" means the catalyst may contain a small number of such groups, but not so many that the reaction is affected adversely or the product contaminated. Illustrative of such groups are carboxyl groups, hydroxyl groups and amino groups.

Catalysts whose polymer chains are of perfluorocarbon monomers are preferred for use in the process of the invention. Illustrative of such monomers are TFE, HFP, CTFE, BTFE and perfluoroalkyl vinyl ethers. Mixtures of monomers can also be used.

Even more preferred as catalysts are copolymers of TFE or CTFE and a perfluoroalkyl vinyl ether containing sulfonic acid group precursors. Most preferred in this class are copolymers of TFE or CTFE and a monomer represented by the structure

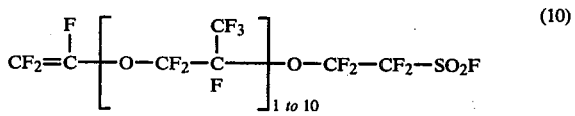

These copolymers are prepared in the sulfonyl fluoride form and are then hydrolyzed to the acid form as described in U.S. Pat. No. 3,692,569.

Most preferred as catalysts are copolymers of TFE and monomers of formula (10) in which the respective monomer unit weight ratios are 50–75/25–50. Such copolymers, having equivalent weights of 1100, 1150 and 1500, are sold by E. I. du Pont de Nemours and Company as Nafion ® perfluorosulfonic acid resin.

The catalyst is present in the reaction mass in a catalytically effective amount, which in the usual case means a concentration of about 0.01% to 30%, by weight of the mass, preferably 0.05% to 15%, even more preferably 0.1% to 10%.

The acylium ion precursor used in the process of the invention can be any compound capable of generating the acyl oxonium ion of equation (1) under reaction conditions.

"Acylium ion", as used herein, means an ion represented by the structure

wherein R is hydrogen or a hydrocarbon radical, preferably an alkyl radical of 1 to 36 carbon atoms.

Representative of acylium ion precursors are acyl halides and carboxylic acid anhydrides. Anhydrides of carboxylic acids whose carboxylic acid moieties contain 1 to 36 carbon atoms are preferred, especially those of 1 to 4 carbon atoms.

Illustrative of such anhydrides are acetic anhydride, propionic anhydride and formic-acetic anhydride. The anhydride preferred for use because of its efficiency is acetic anhydride.

The acylium ion precursor is ordinarily present in the reaction mass, at least initially, at a concentration of 0.1 to 15 mol percent, preferably 0.7 to 10%.

The molecular weight of the polymer product can be limited by the addition to the reaction mass of an aliphatic carboxylic acid of 1 to 36 carbon atoms, preferably 1 to 5 carbon atoms. Acetic acid is preferred for its low cost and effectiveness.

The acylium ion precursor/acid weight ratio should be within the range of 20/1 to 0.1/1, preferably 10/1 to 0.5/1. Generally speaking, the more carboxylic acid used, the lower the molecular weight of the product.

The aliphatic carboxylic acid, when it is used, is ordinarily added to the reaction mass at a concentration of 0.1 to 10% by weight of the THF, preferably 0.5 to 5%.

Since the preferred acylium ion precursor, acetic anhydride, reacts with THF and the catalyst to give the corresponding acid, separate addition of an acid in that instance is not necessary, although it is generally desirable for improved molecular weight control.

To obtain a product having a commercially desirable number average molecular weight of 650 to 30,000, it is preferred that the acylium ion precursor and carboxylic acid be present in the reaction mass at a combined concentration of 0.5 to 20%, by weight of the reaction mass, preferably 1 to 10%.

The process of the invention can be run in a batch mode or continuously.

When run in a batch mode, proper amounts of THF, acylium ion precursor, catalyst and carboxylic acid are placed in a reactor and stirred while reaction conditions are maintained at optimum. When the reactions are finished, the catalyst and the reaction mass are separated, and the product is then separated from the remainder of the mass. When run continuously, the process is preferably and similarly run in a back-mixed slurry reactor, with continuous stirring and with continuous addition of reactants and continuous removal of product. Alternatively, the process can be run in a pipeline reactor.

In a pipeline reactor, the process is run under plug-flow conditions, whereby premixed reactants move through the reactor, which is packed with catalyst. The movement is continuous, with little or no mixing of the initial feed with partially converted reactants, and with the reactants reacting as they move along.

The pipeline reactor is preferably oriented vertically, with the reactants moving upwardly through the catalyst, which tends to suspend the catalyst and make the flow of reactants freer. The reactants can also move downward through the reactor, but this tends to compact the catalyst and restrict the flow of reactants.

In either the slurry reactor or the pipeline reactor, it is preferable to adjust the temperature in the reaction zone, the concentration of reactants in the reaction zone, and the flowrate of the reactants into and out of the reaction zone so that about 5 to 85%, by weight, preferably 15 to 60%, even more preferably 15 to 40% of the THF is converted to ester end-capped PTMEG on each pass through the reactor. The effluent of each pass, after the product has been removed, can be recycled to the reactor. It is also preferable that at least about 40%, by weight, even more preferably about 80 to 90%, of the acylium ion precursor be consumed on each pass of reactants through the reactor. With proper adjustment of concentrations of reactants in the feed stream, of flowrates and of temperature, all of these conditions can ordinarily be obtained with a residence time of the reactants in a continuous reactor of 10 minutes to 2 hours, preferably 15 to 60 minutes, even more preferably 20 to 45 minutes.

Residence time (in minutes) is determined by measuring the volume (in milliliters) of the reaction zone and then dividing this figure by the flowrate (in milliliters per minute) of the reactants through the reactor. In a slurry reactor, the reaction zone is the entire volume of the reaction mixture; in a pipeline reactor the reaction zone is the zone containing the catalyst.

The foregoing description will be more easily understood by referring to the drawings.

In the apparatus shown in FIG. 1, THF, acylium ion precursor and acid are fed by lines 1, 2 and 3, respectively, into tank 4, where they are mixed. The mixture is then fed by line 5 into slurry reactor 6A. The reaction mixture 7, which contains residual catalyst, is continuously stirred by agitator 8. The effluent, which contains the product and excess reactants, is drawn from the reactor through line 9 after first passing through filter 10 which holds back the catalyst. The effluent is then fed into purifier 11, where ester end-capped PTMEG is separated from the excess reactants, using conventional chemical engineering techniques, and is withdrawn through line 12. The excess reactants are withdrawn from the purifier through line 13 and fed into tank 4, where they are mixed with fresh feedstock and recycled to the reactor through line 5.

Figure 2:
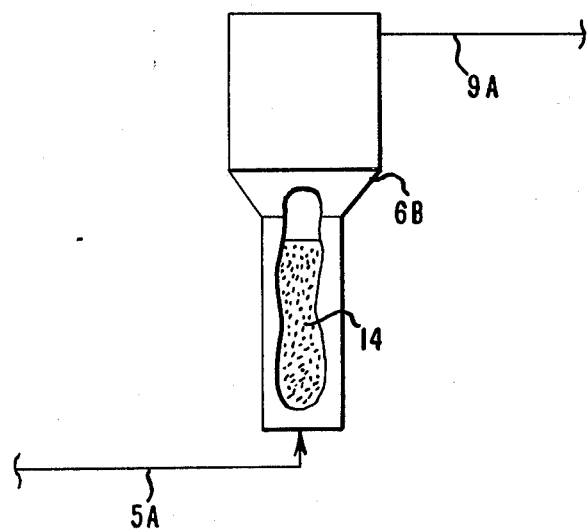
FIG. 2 is an insert for FIG. 1, showing use of a pipeline reactor instead of a slurry reactor.

In the apparatus shown in FIG. 2, the reactant feed flows through line 5A into the bottom of pipeline reactor 6B packed with catalyst 14. The reaction mixture flows upwardly through the reactor and the effluent is taken from the reactor through line 9A and fed into purifier 11.

In either the batch or continuous mode, the process is ordinarily run at atmospheric pressure, but reduced or elevated pressure may be used to aid in controlling the temperature of the reaction mass during the reaction.

The temperature of the reaction mass is kept in the range of 0° to 120° L C., preferably 22° to 65° C.

It is preferable to exclude oxygen from the reaction zone. This can be done by running the process in an inert atmosphere, such as of dry nitrogen or argon.

The time required for the process to provide a given conversion of THF to polymer depends upon the conditions under which it is run. Time will therefore vary with temperature, pressure, concentrations of reactants and catalyst, and like factors. Generally, however, in a continuous mode, the process is run to give a residence time of 10 minutes to 2 hours, preferably 15 minutes to 60 minutes, even more preferably 20 to 45 minutes. In the batch mode, the process is ordinarily run for 1 to 24 hours.

On completion of the polymerization reaction, the catalyst can be separated from the reaction mass by filtration, decantation or centrifugation, and reused. If the process is run in a continuous fashion, the catalyst can simply be allowed to remain in the reactor while fresh reactants are fed in and product is removed.

In either the batch or continuous mode, after removal of the catalyst, the product is separated from the reaction mass by extracting residual unreacted THF, acylium ion precursor and carboxylic acid from the reaction mass by distillation or by stripping the reaction mass with steam or an inert gas such as nitrogen.

The ester end-capped product thus produced can be converted to PTMEG by reacting it with an alkanol, using a basic catalyst to give PTMEG and an alkyl acetate byproduct. This is described in greater detail in the copending application of Gerfried Pruckmayr, Ser. No. 672,557, filed Mar. 31, 1976, now abandoned.

The ester end-capped product can range in physical properties from a clear viscous liquid to a waxy solid. The number average molecular weight of the product can be as high as about 30,000, but will usually range from 650 to about 5,000, and more commonly will range from about 650 to 2,900.

Number average molecular weight is determined by end group analysis using spectroscopic methods well known in the art.

The molecular weight of the product can be kept within any range desired by varying the carboxylic acid/acylium ion precursor ratio in the reactant feed, by varying the total amounts of carboxylic acid and precursor in the reactant feed, by varying the temperature of the reaction mass within certain limits, by controlling the residence time of the reactants in the reaction zone and by varying the catalyst concentration. Generally speaking, use of larger amounts of carboxylic acid and-/or acylium ion precursor gives polymers with lower molecular weights; lower reaction temperatures favor production of polymers with higher molecular weights and higher temperatures favor production of polymers with lower molecular weights; higher catalyst concentrations favor lower molecular weights.

EXAMPLES

A Nafion® perfluorosulfonic acid resin powder with an equivalent weight of 1,100 and an average particle size of 0.2 to 0.5 mm was used in the following examples and is referred to as the catalyst.

All polymerizations were conducted at 22° C. and at ambient pressure, except where indicated otherwise.

Screen meshes are expressed in Tyler Series sizes.

Percentages are by weight unless otherwise indicated.

Although molecular weights were not determined for some of the samples, the intrinsic viscosity figures given in their stead are indicative of variations in molecular weight. Intrinsic viscosity is the value obtained by extrapolating to zero concentration the ratio of the specific viscosity of a given solution to the concentration of that solution.

EXAMPLE 1

A 1.75 g sample of catalyst was added to a flame dried and tared flask which was then evacuated to $10^{-5}$ mm Hg pressure and heated to 120° C. for 16 hours. By reweighing the flask it was determined that 1.60 g of anhydrous catalyst was present.

Next, 134.8 g of THF, dried over lithium aluminum hydride, and 1.08 g of acetic anhydride were distilled into the flask using standard vacuum line technique, and the mixture was stirred for 24 hours. Then 500 ml (444 g) of THF was added to reduce solution viscosity, and the catalyst was removed by filtration.

Evaporation of unpolymerized THF under reduced pressure, followed by drying at 80° C. and 120 mm of Hg gave 89.8 g (66 weight percent conversion of the THF) of polymer with an intrinsic viscosity $[\eta]$, of 1.05 and an absorption peak at 1750 $cm^{-1}$ in the infrared spectrum, characteristic of acetate end groups.

Under similar conditions but in the absence of acetic anhydride and therefore outside of the invention, 51.4 g (36% conversion) of polymer was obtained with $[\eta]=4.04$, indicative of a very high molecular weight, and with no acetate end groups.

EXAMPLE 2

Wet catalyst (about 1.0 g containing about 0.3 g water) was mixed with 30 ml (26.6 g) of THF, and the THF was decanted. Fresh THF (50 ml, 44.4 g) and 2.16 g (2 ml) of acetic anhydride were added to the catalyst and the mixture was stirred for 4 hours. This was more than enough acetic anhydride to combine with all the water present, forming acetic acid.

After filtering the catalyst from the reaction mass, stripping the solvent under vacuum, and drying the product at 90° C. at 50 mm Hg, 12.5 g (30% conversion) of polymer with $[\eta]=0.30$ was obtained (Sample 1).

Under similar conditions but using dry catalyst and in the absence of water, 38% conversion of THF to polymer with $[\eta]=0.78$ was obtained in 2 hours (Sample 2). The results are summarized below.

| Sample No. | Catalyst[1] (g) | THF (g) | Acetic Anhydride (g) | Time (hr) | PTMEA (g) | Conversion (%) | $[\eta]$ |
|---|---|---|---|---|---|---|---|
| 1 | 0.7 | 44.4 | 2.16 | 4 | 12.5 | 30 | 0.30 |
| 2 | 0.84 | 72 | 2.1 | 2 | 27 | 38 | 0.78 |

[1]Dry weight

EXAMPLE 3

A series of separate batch runs covering the range of 9:1 to 1:9 weight ratio of acetic anhydride:acetic acid was carried out by adding 3 g of catalyst to a reaction vessel, adding 70 ml (62 g) of a solution in THF of varying amounts of acetic anhydride and acetic acid, and then stirring the reaction mass at 22° C. for the indicated time.

Samples were removed at intervals for percent conversion and molecular weight determination. The results are presented below (Samples 3 to 9).

These experiments show that molecular weight can be a function of acetic anhydride:acetic acid ratio and of time.

| Sample No. | THF (g) | Acetic Anhydride (g) | Acetic Acid (g) | Ratio Anhydride Acid | Time (hr) | Conversion % | $\overline{Mn}$ |
|---|---|---|---|---|---|---|---|
| 3 | 55.8 | 3.1 | 3.1 | 1:1 | 1.5 | 37 | 1528 |
| 4 | 55.8 | 3.1 | 3.1 | 1:1 | 5.5 | 60 | 1488 |
| 5 | 55.8 | 3.1 | 3.1 | 1:1 | 21 | 61 | 1397 |
| 6 | 55.8 | 5.6 | 0.6 | 9:1 | 1.5 | 47 | 2808 |
| 7 | 55.8 | 5.6 | 0.6 | 9:1 | 5.5 | 74 | 1270 |
| 8 | 55.8 | 5.6 | 0.6 | 9:1 | 21 | 82 | 1002 |
| 9 | 55.8 | 0.6 | 5.6 | 1:9 | 21 | 23 | 2304 |

EXAMPLE 4

A batch polymerization of THF was carried out as in Example 3, using 1 g of catalyst with 0.36 g of trifluoroacetic acid and 21 ml (18.7 g) of solution of THF containing 10% acetic anhydride. The results are presented below (Samples 10 to 12).

| Sample No. | Ratio Anhydride: Acid | Time (hr) | Conversion % |
|---|---|---|---|
| 10 | 5.8:1 | 3 | 58 |
| 11 | 5.8:1 | 8 | 78 |
| 12 | 5.8:1 | 24 | 83 |

The resulting polymers were viscous oils having both acetate and trifluoroacetate end groups.

EXAMPLE 5

A mixture of 75.5 g THF, 3.1 g propionic anhydride and 1.0 g catalyst was stirred for 4 hours.

After the catalyst was removed by filtration and the unreacted THF was removed by vacuum distillation, 24.1 g (33.5% conversion) of polymer with propionate end groups was obtained.

EXAMPLE 6

A mixture of 75.5 g THF, 4.2 g formic-acetic anhydride and 1.0 g catalyst was stirred for 2.5 hours.

After the catalyst was removed by filtration and the unreacted THF was removed by vacuum distillation, 16.3 g (23% conversion) of polymer with $[\eta]=0.33$ was obtained.

EXAMPLE 7

A mixture of 72.0 g THF, 5.0 g propionic anhydride, 3.0 g acetic acid and 1.0 g catalyst was stirred for 6 hours. Analysis of the mixture from which the catalyst had been removed by filtration, by NMR spectroscopy showed that 19% of the THF had been converted to polymer having propionate and acetate end groups in a 3:2 ratio and a $\overline{Mn}$ of 1500.

EXAMPLE 8

A mixture of 2 g catalyst, 100 g THF, 10 g PTMEG having an $\overline{Mn}$ of 650, and 6 g acetic anhydride was stirred at 25° C. for 4 hours. The catalyst was then separated from the mixture by filtration and unreacted monomer was removed by vacuum distillation. The polymer yield was 42 g and the molecular weight of the PTMEG diacetate was 2000.

EXAMPLE 9

A 1 g sample of catalyst, dried as in Example 1, was added to a monomer mixture consisting of 80 g of THF and 20 g of 3-methyl-tetrahydrofuran (3MeTHF). A mixture of 9 g of acetic anhydride and 1 g of acetic acid was added, and the system was stirred for 4 hours at 22° C. At this point, the polymerization was interrupted by removing the catalyst by filtering it from the colorless, viscous polymer solution. Unreacted monomer was removed from the reaction mass by vacuum distillation, and the polymeric product was extracted with water and dried at 2 mm of pressure and 80° C. to constant weight.

| | |
|---|---|
| Conversion to diacetate copolymer: | 56% |
| Yield of pure copolymer (% of total polymer): | 94% |
| $\overline{Mn}$ | 3130 |
| Molar composition of copolymer: | 11% 3 MeTHF units 89% THF units |

EXAMPLE 10

A 1 g sample of catalyst, dried as in Example 1, was added to a monomer mixture consisting of 40 g of THF and 10 g of 2-methyl-tetrahydrofuran (2 MeTHF). A mixture of 4.5 g of acetic anhydride and 0.5 g of acetic acid was added, and the system was stirred for 5 hours. At this point, the polymerization was interrupted by removing the catalyst by filtering it from the colorless, viscous polymer solution. Unreacted monomer was removed from the reaction mass by vacuum distillation, and the polymeric product was washed with water and dried as in Example 9.

| | |
|---|---|
| Conversion to diacetate copolymer: | 44% |
| Yield of pure copolymer (% of total polymer): | 89% |
| $\overline{Mn}$ | 1800 |
| Molar composition of copolymer: | 6.5% 2 MeTHF units 93.2% THF units |

EXAMPLE 11

A vertical pipeline reactor was used having a volume of 50 ml and an inside diameter of 25 mm, and having stainless steel screen packs (120 mesh) to retain the catalyst at each end of the tube. Valves and tubing were provided to feed the reactants in below the bottom screen pack and to take reactants and products off above the top screen pack. A constant temperature bath surrounded the reactor.

With 5 g of catalyst in the reactor chamber, dried as in Example 1, and a reactant feed composition of 90% THF, 9% acetic anhydride and 1% acetic acid, the reactants were fed in and product was removed at a rate to give a controlled residence time.

With a residence time of 190 minutes, the conversion of THF to PTMEA was 49% with $\overline{Mn}$ of 1,500 to 2,000. With a contact time of 425 minutes, the conversion was 74% and the polymer had $\overline{M}n$ of 900 to 1,200. Runs made in the same reactor, with the same feed composition and with a 43 minute residence time, gave a THF conversion of 39% and a productivity of 5 g PTMEA/g catalyst/hr.

The same system can be operated in either an upflow or downflow mode.

EXAMPLE 12

A reaction vessel as shown in FIG. 1, having a volume of 100 ml was used.

The vessel was operated with a liquid volume of 50 ml. The reaction mixture was stirred mangetically. A constant temperature bath surrounded the reactor.

With an initial charge of 1 g of catalyst, dried as in Example 1, and a reactant feed composition containing 3.5% acetic anhydride and 1.5% acetic acid in THF, the reactor was operated at 42° C. with a residence time of 52 minutes. After steady state operations were obtained, it was found that polymer was produced at 21% conversion with $\overline{M}n$ of 2,000 to 2,200. The productivity of this system was found to be 11.1 g of PTMEA/g catalyst/hr.

A similar run, under the same operating conditions, but carried out in a pipeline reactor, gave 9 g PTMEA/g catalyst/hr. The PTMEA had $\overline{M}n=4,800$.

EXAMPLE 13

The apparatus used was similar to that shown in FIG. 1. Filter 10 was a 100 mesh stainless steel screen. Agitator 8 revolved at 100 rpm.

Catalyst was charged into the reactor and a feed stream containing THF, acetic acid and acetic anhydride was pumped into the reactor at a rate of 5.7 ml/minute, to attain a residence time of the reactants in the reactor of 35 minutes. The THF contained less than about 0.001%, by weight of water, less than about 0.002% of peroxide and contained about 0.025% of butylated hydroxytoluene.

The reaction mass (less the catalyst) was continuously removed from the reactor and residual THF, acetic acid and acetic anhydride were removed by vacuum distillation, leaving PTMEA product behind. Reclaimed THF, acetic acid and acetic anhydride were recycled to the reaction kettle.

The results are shown below:

| % THF | % Acetic Anhydride | % Acetic Acid | Temperature °C. | g Cat. | % Conversion | $\overline{M}n$ |
|---|---|---|---|---|---|---|
| 96.4 | 1.8 | 1.8 | 50 | 8 | 24 | 2000 |
| 96 | 2.8 | 1.2 | 50 | 8 | 30 | 2900 |
| 96 | 2.0 | 2.0 | 55 | 8 | 23 | 1500 |
| 94 | 3.0 | 3.0 | 55 | 12 | 28 | 1000 |
| 92 | 4.0 | 4.0 | 55 | 12 | 30 | 650 |

We claim:

1. A process for preparing ester end-capped poly(tetramethylene ether) glycol, or ester end-capped poly(tetramethylene ether) glycol copolymer, the process comprising
   (A) bringing together, at a temperature of 0° to 120° C.,
   (1) tetrahydrofuran, and optionally, up to 50% by weight of the tetrahydrofuran of a copolymerizable alkyl tetrahydrofuran represented by the structure

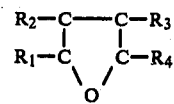

where any one of $R_1$, $R_2$, $R_3$ or $R_4$ is an alkyl radical of 1 to 4 carbon atoms, the remaining R's being hydrogen;
   (2) an acylium ion precursor which is a compound capable of generating, under reaction conditions, an acylium ion represented by the structure

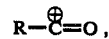

where R is hydrogen or a hydrocarbon radical,
   (3) as a catalyst, a homopolymer of an ethylenically unsaturated monomer (a) containing groups such that the final polymer will contain groups of the formula

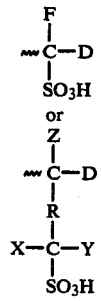

wherein ⌇ represents the polymer chain or a segment thereof;
D is hydrogen, an aliphatic or aromatic hydrocarbon radical of 1 to 10 carbon atoms, a halogen or a segment of the polymer chain;
X and Y are hydrogen, halogen or an aliphatic or aromatic hydrocarbon radical of 1 to 10 carbon atoms, but at least one of X or Y must be fluorine;
R is a linear or branched linking group having up to 40 carbon atoms in the principal chain; and
Z is hydrogen, halogen or an aliphatic or aromatic hydrocarbon radical of 1 to 10 carbon atoms;
or a copolymer of monomer (a) with at least one other copolymerizable ethylenically unsaturated monomer (b), the homopolymer or copolymer being effectively free of functional groups which interfere with the reaction; and
   (4) optionally, an aliphatic carboxylic acid of 1 to 36 carbon atoms; and then
(B) separating the resulting ester end-capped poly(tetramethylene ether) glycol product from the reaction mass.

2. The process of claim 1 in which the acylium ion precursor in (A) (2) is an anhydride of an aliphatic carboxylic acid whose carboxylic acid moieties contain 1 to 36 carbon atoms.

3. The process of claim 2 in which the acylium ion precursor is acetic anhydride.

4. The process of claim 1 in which the aliphatic carboxylic acid in (A) (4) is one of 1 to 5 carbon atoms.

5. The process of claim 4 in which the acid is acetic acid.

6. The process of claim 1 in which the catalyst has a solubility in the reaction mass of no more than 5% be weight, when run in a batch mode at 22° to 65° C.

7. The process of claim 1 in which the catalyst in (A) (3) is a copolymer of monomer (a) and a perfluorocarbon monomer.

8. The process of claim 7 in which the catalyst is a copolymer of tetrafluoroethylene or chlorotrifluoroethylene and a monomer represented by the structure

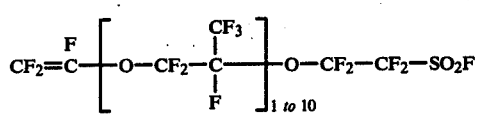

the tetrafluoroethylene or chlorotrifluoroethylene and monomer units being present in weight ratios of 50-75/25-50, respectively, the copolymer being hydrolyzed to the acid form.

9. The process of claim 1 conducted in a continuous fashion.

10. The process of claim 9 conducted in a backmixed slurry reactor.

11. The process for preparing ester end-capped poly(tetramethylene ether) glycol, the process comprising continuously
(A) bringing together at 0° to 120° C., tetrahydrofuran, acetic anhydride, acetic acid and a catalytically effective amount of a copolymer of tetrafluoroethylene or chlorotrifluoroethylene and a monomer represented by the structure

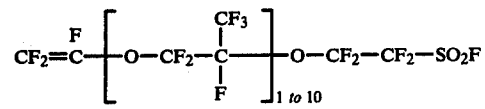

the tetrafluoroethylene or chlorotrifluoroethylene and monomer units being present in weight ratios of 50-75/25-50, respectively, the copolymer being hydrolyzed to the acid form, and then
(B) separating the resulting ester end-capped poly(tetramethylene ether) glycol from the reaction mass.

12. The process of claim 11 run in an inert atmosphere.

13. The process of claim 1 wherein the acylium ion precursor is a compound capable of generating, under reaction conditions, an acylium ion represented by the structure

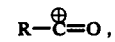

where R is an alkyl radical of 1–36 carbon atoms.